(12) United States Patent
Hofbeck et al.

(10) Patent No.: US 7,298,262 B2
(45) Date of Patent: Nov. 20, 2007

(54) SYSTEM AND METHOD FOR DETECTING SEAT OCCUPANCY IN A VEHICLE

(75) Inventors: Klaus Hofbeck, Neumarkt (DE); Birgit Rösel, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 94 days.

(21) Appl. No.: 10/536,041

(22) PCT Filed: Nov. 18, 2003

(86) PCT No.: PCT/EP03/12907

§ 371 (c)(1),
(2), (4) Date: May 20, 2005

(87) PCT Pub. No.: WO2004/045917

PCT Pub. Date: Jun. 3, 2004

(65) Prior Publication Data

US 2006/0061470 A1   Mar. 23, 2006

(30) Foreign Application Priority Data

Nov. 20, 2002   (DE) ................................ 102 54 197

(51) Int. Cl.
*G08B 13/18* (2006.01)

(52) U.S. Cl. ...................... 340/553; 340/438; 280/735; 701/45; 342/72

(58) Field of Classification Search ................ 340/436, 340/438, 561, 5.61, 5.72, 553, 501, 541, 340/667, 562; 280/734, 735; 701/45–47; 342/72; 180/271, 273, 274

See application file for complete search history.

(56) References Cited

U.S. PATENT DOCUMENTS 3,787,841 A * 1/1974 Buehler et al. ............... 342/33

(Continued)

FOREIGN PATENT DOCUMENTS

DE      198 39 696 A1     3/2000

(Continued)

OTHER PUBLICATIONS

RFID Handbuch: "Grundlagen und praktische Anwendungen induktiver Funkanlagen, Transponder und kontaktloser Chipkarten", 3. Auflage, Carl Hanser Verlag München, Sep. 2002, ISBN 3-446-22071-2, 5 pgs.

(Continued)

*Primary Examiner*—Anh V. La
(74) *Attorney, Agent, or Firm*—Laurence A. Greenberg; Werner H. Stemer; Ralph E. Locher

(57) ABSTRACT

A system for determining seat occupancy in a motor vehicle includes a microwave transmitter, a microwave receiver and preferably a reflector. If a person is between those appliances, the microwave radiation is attenuated. The reflector can be a backscattering device, such that the radiation received by the receiver is unequivocally associated with the reflector. Furthermore or alternatively, the transit time of the microwaves can be measured, to be subsequently processed in combination with an analysis of the seated position of passengers. In preferred embodiments, the microwave radiation diffraction properties around an object are also used to obtain the seated position of passengers. The determination of a seat occupancy and optionally of seat occupancy mode can be advantageously used for locking or on the other hand releasing an airbag.

24 Claims, 4 Drawing Sheets

U.S. PATENT DOCUMENTS

| | | | |
|---|---|---|---|
| 4,642,741 A * | 2/1987 | Cohn | 362/320 |
| 6,199,904 B1 | 3/2001 | Dosdall | |
| 6,243,012 B1 * | 6/2001 | Shober et al. | 340/572.7 |
| 6,462,701 B1 | 10/2002 | Finn | |
| 6,509,836 B1 * | 1/2003 | Ingram | 340/572.4 |
| 6,809,629 B2 * | 10/2004 | Heide et al. | 340/5.61 |
| 2002/0140215 A1 | 10/2002 | Breed et al. | |
| 2003/0144010 A1 | 7/2003 | Dollinger | |

FOREIGN PATENT DOCUMENTS

| | | |
|---|---|---|
| DE | 199 57 549 A1 | 6/2001 |
| DE | 199 57 557 A1 | 6/2001 |
| DE | 100 24 474 A1 | 11/2001 |
| WO | 99/54175 | 10/1999 |

OTHER PUBLICATIONS

EDA-Zentrum: "Entwicklung eines Mikrochips zur Realisierung von Identifikationssystemen", Einführung in Identifikationssysteme, XP-002272961, pp. 1-17.

* cited by examiner

SYSTEM AND METHOD FOR DETECTING SEAT OCCUPANCY IN A VEHICLE

BACKGROUND OF THE INVENTION

Field of the Invention

The invention relates to a system for detecting seat occupancy in a vehicle, said system comprising at least one microwave transmitter, at least one reflector and at least one microwave receiver, the at least one microwave transmitter, the at least one reflector and the at least one microwave receiver being disposed such that between the at least one microwave transmitter and the at least one microwave receiver a radiation path is provided which is divided into at least one first radiation path and at least one second radiation path, such that microwave radiation emitted from the at least one microwave transmitter can reach, via the at least one first radiation path, the at least one reflector at least when the seat is unoccupied and such that microwave radiation reflected by the at least one reflector can reach, via the at least one second radiation path, the at least one microwave receiver and such that, depending on the seat occupancy, an object can be located in the first radiation path and/or the second radiation path so that the radiation received by the microwave receiver can be influenced depending on the seat occupancy.

The invention also relates to a system for detecting seat occupancy in a vehicle, said system comprising at least one microwave transmitter and at least one microwave receiver, the at least one microwave transmitter and the at least one microwave receiver being disposed such that microwave radiation emitted by the at least one microwave transmitter can reach, via a radiation path, the at least one microwave receiver at least when the seat is unoccupied and such that, depending on the seat occupancy, an object can be located in the radiation path so that the radiation received by the microwave receiver can be influenced depending on the seat occupancy.

The invention relates furthermore to a method for detecting seat occupancy in a vehicle, said method comprising the steps: emission of microwave radiation, reflection of the emitted microwave radiation and receiving of the reflected microwave radiation, whereby a radiation path is provided which is divided into at least one first radiation path and at least one second radiation path, the emitted microwave radiation travels via the at least one first radiation path, the reflected microwave radiation travels via the at least one second radiation path and an object can be located, depending on the seat occupancy, in the first radiation path and/or the second radiation path, so that the received radiation can be influenced depending on the seat occupancy.

The invention also relates to a method for detecting seat occupancy in a vehicle, said method comprising the steps: emission of microwave radiation and receiving of microwave radiation, wherein the emitted microwave radiation travels via a radiation path and, depending on the seat occupancy, an object can be located in the radiation path so that the received radiation can be influenced depending on the seat occupancy.

Systems and methods of this type are known. They serve in particular to influence the activation behavior of an airbag depending on seat occupancy.

An example of such a system and method is known from U.S. Pat. No. 6,199,904 B1. Here, microwaves are transmitted by a microwave transmitter to a reflecting structure in a vehicle seat. The reflected microwaves are recorded by a microwave receiver. Since the intensity of the reflected microwaves depends on whether the microwave radiation is attenuated by a person who is occupying the seat, conclusions can be drawn from the result of the evaluation as to seat occupancy. A disadvantage of the system and method, however, is that the airbag control is not always based on reliable evaluations. For example, it can be possible for reflection to occur on objects other than those reflection objects provided for the purpose in the seat. This would simulate the result that the seat was not occupied, which could result in the airbag being locked. This can have life-threatening consequences for the occupants of the vehicle. Furthermore, the calibrations required as part of the configuration process are very expensive, which drives up the cost of the system. Furthermore, all additional evaluations involve computing time, which would stand in the way of dynamic measurement, that is measurement only in the event of a vehicle impact.

SUMMARY OF THE INVENTION

The object of the invention is to provide a system and a method which overcome the disadvantages of the prior art and which in particular enable reliable and cost-effective detection of seat occupancy.

This object is achieved in the features of the independent claims.

Advantageous embodiments of the present invention are described in the dependent claims.

The invention builds upon the generic system which is fitted with a reflector in that the at least one reflector 12 is a modulating backscattering device or a non-modulating backscattering device, whereby in the latter case the signal transit time is determined in the receiver in order to establish from which reflector the received signal originates. Modulation of the microwave radiation by the backscattering device makes it possible for the reflector to be readily distinguished from other metallically conductive objects. If, for example, reflection of the microwave radiation occurs on the casing of a laptop which the passenger in a car is working on, then this will not lead to the system assuming that the seat is unoccupied. An airbag would therefore trigger in the event of an impact.

The terms "reflector, reflect, etc." are used in the context of the present disclosure in a very general sense. Not only reflection in the traditional sense is meant but also, for example, the return of electromagnetic radiation by means of a modulating or non-modulating backscattering process.

The invention builds furthermore upon the generic system in that the path between microwave transmitter and microwave receiver covered by the microwave radiation can be determined by measurement of the transit time. It is possible by this means to determine the setting of the seat. The distance between transmitter and reflector can also be determined by measurement of the transit time and the received signal thus assigned to the reflector. Information is in this way also available for airbag control.

It is particularly useful in this connection that the position of a seat can be determined and that, from the result of determination of the path and from the result of determination of the position of the seat, it can be determined whether the radiation received by the microwave receiver has traveled via the radiation path between microwave transmitter and microwave receiver. Such plausibility considerations are basically unnecessary where a backscattering device is used as a reflector but can nonetheless be used for redundancy purposes. The considerations are particularly useful because of the transit time of the microwave signals, however, if no pattern is stamped on the reflected microwave radiation, for example, by a backscattering process. It can then be established by means of additional analysis of the position of the seat whether the reflection may stem, for example, from a reflector in the seat rest or whether the reflection originates from a laptop on the passenger's lap.

It can furthermore be useful in the system according to the invention for the at least one microwave transmitter and the at least one microwave receiver to be disposed spatially separated. The separate arrangement of microwave transmitter and microwave receiver makes it possible for a system to be implemented without a reflector. For example, the microwave transmitter can be disposed in the roof or on the dashboard, while the microwave receiver is located in the back rest of a seat. This arrangement is in contrast to the prior art, in which a large-area reflection in the seat was used in order to reflect the emitted microwave radiation to the transmitter.

It is particularly advantageous if the backscattering device is a modulating backscattering device. By means of the pattern stamped by modulation, the reflected signal can be uniquely assigned to a reflector.

The system according to the invention is further developed in an advantageous manner in that the at least one microwave transmitter and the at least one microwave receiver are implemented as at least one microwave transmitting and receiving device with a transmitting and a receiving antenna.

The microwave radiation thus goes from the microwave transmitting and receiving device via the first radiation path to the reflector and back from the reflector via the second radiation path to the microwave transmitting and receiving device, the at least one first radiation path and the at least one second radiation path thus being essentially identical. The microwave transmitting and receiving device may, for example, be located in the dashboard of the vehicle. If the reflector is mounted in the back rest of the seat to be monitored, then the course of the beam of the emitted and of the reflected microwave radiation will, where applicable, pass through the upper body region of a passenger. If a person is sitting properly on the seat, then he/she will cover the reflector, and the receiving antenna will receive a level approximately six orders of magnitude lower than when the person is not present. Where the antenna is disposed in the dashboard or in the cockpit and the reflector is disposed in the seat back rest, it can even be detected if a person is not in a proper seated position. If the person is inclined forward, then a proportion of the emitted microwave radiation can reach the reflector through diffraction of the microwave radiation around the body. This typical pattern is communicated to the airbag system which then evaluates whether the airbag can still be activated, i.e. when the inclination is limited, or whether no activation should still take place, i.e. in the case of a marked inclination. The arrangement of the antenna in the cockpit and of the reflector in the back rest likewise means that, for example, a child seat can be transported safely on the front passenger seat. The bulk of the microwave radiation will pass unimpeded to the reflector and back from this to the receiver, so that the activation of an airbag can be prevented, since the child seat will in general be made of plastic and the radiation will be damped only by the body of the child.

As an additional safety measure, it is possible to mount a further reflector on the child seat. In this way, microwave radiation which would otherwise have been absorbed in the child seat or in the child sitting in the child seat will also be reflected. Activation of the airbag can thus be prevented even more reliably. If modulating backscattering devices are used as reflectors, then the backscattering devices in the seat rest or on the child seat can modulate the signals differently so that it can be detected unambiguously that a child seat is located on the seat.

It is particularly useful that a control unit is provided which, depending on the radiation received by the microwave receiver, triggers, locks or releases functions in the vehicle. The detection of seat occupancy can also be appropriate in connection with other functions in the vehicle, but the release or locking of an airbag is a particularly important achievement of the present invention.

This can for example also be fashioned such that the at least one reflector is an electrically conductive foil. Such a foil can be incorporated in a simple manner into the back of a seat, with virtually no additional installation space being needed and virtually no additional weight being added.

The system according to the invention can be further developed by implementing the backscattering device as a passive, semipassive, semiactive or active backscattering device. Passive backscattering devices are constructed particularly simply, need no additional energy supply and insofar provide a particularly cost-effective solution. Semipassive backscattering devices are operated with an additional amplifier which takes a small amount of electrical power. They have the advantage compared with passive backscattering devices that they can reflect with higher intensity. More reliable evaluations can be carried out on this basis. An active backscattering device, that is a backscattering device with active electronic components, would carry out a particularly reliable evaluation. This enables particularly reliable evaluation due to increased microwave intensities. However, due to the microwave radiation, the loading on the vehicle passengers is higher in this embodiment of the present invention than in the case of passive backscattering devices. The semiactive backscattering device is similar to the semipassive backscattering device, but exhibits amplification of the signal to be reflected.

The system according to the invention can be further developed in a particularly advantageous manner in that the at least one microwave transmitter and/or the at least one microwave receiver are integral components of an access control and ignition system installed in the vehicle. In microwave-based access control and ignition systems, the antenna for covering the interior is generally located in such a position that it can also respond to reflectors disposed in the vehicle seats. Consequently, the embodiment of the present invention, wherein components of the access control and ignition system are used for detecting seat occupancy, can provide an integrating and thus cost-reducing measure.

For comparable reasons, it can be advantageous for the evaluation of the signals received by the microwave receiver to be supported or carried out by means which are deployed as part of an access control and ignition system installed in the vehicle.

It can furthermore be useful for several differently modulating backscattering devices to be provided. These can be mounted, for example, at different heights in the seat back rest. If these reflectors are encoded differently, then in addition to the basic detection of seat occupancy, the size of the passenger and his/her position on the seat can be detected. This information can be taken into account for example when an airbag is activated or when several airbags in different positions are activated.

The system according to the invention is advantageously fashioned such that the at least one first radiation path and/or the at least one second radiation path follow a straight-line route. When talking of a radiation path following a straight-line route in the present context, then this refers to the propagation of the radiation excluding diffraction phenomena. The present remarks consequently relate to the geometric arrangement of the components. With no object in the radiation paths, there are therefore direct lines of sight between transmitter, reflector and receiver. A particularly simple system is provided in this way.

It can, however, also be useful for the at least one first radiation path and/or the at least one second radiation path to follow a roundabout route. The microwave radiation can be guided through the vehicle by means of conductive materials used in the vehicle such that certain zones can be selectively illuminated without additional microwave transmitting and receiving devices being required.

The system according to the invention is further developed in a particularly advantageous manner in that the position of the object in the radiation path influences the intensity received by the microwave receiver on the basis of the diffraction of microwaves around the object and in that the intensity received by the microwave receiver provides information about the position of the object. Since microwave radiation, in contrast to infrared radiation, for example, can, due to its wavelength, exhibit marked diffraction phenomena at an object disposed in the radiation path, it is possible to make use of the changes in intensity due to diffraction effects. For example, the leaning forward of a person on a seat can be detected if, in so doing, this person on the one hand adequately shields a reflector disposed in the seat base, but on the other hand exposes a reflector disposed in the back rest in such a manner that microwaves diffracted around the object can reach the reflector. An empty seat can thus be distinguished from a seat occupied by an adult and also for example from a seat occupied by a child with a child seat, since in the latter case diffraction to a reflector disposed in the seat base can also occur due to the position of the child being raised by the child seat.

The invention builds furthermore on the generic method, in which emitted microwave radiation is reflected, firstly in that the reflection is effected by means of a backscattering process.

The advantages and special features of the systems according to the invention are implemented on the basis of these inventive methods. This also applies to the particularly preferred embodiments of the inventive methods specified below.

On the one hand, the invention builds alternatively or additionally on the generic method in that the path covered by the microwave radiation is determined by measurement of the transit time.

Furthermore, the method according to the invention preferably provides that the position of a seat is determined and that, from the result of determination of the path and from the result of determination of the position of the seat, it is determined whether the radiation received has traveled via the radiation path.

It is furthermore advantageously provided in the method according to the invention that the at least one microwave transmitter and the at least one microwave receiver are disposed spatially separated.

It is particularly advantageous if the backscattering process is a modulating backscattering process.

The method according to the invention is in particular further developed in an advantageous manner in that the at least one first radiation path and the at least one second radiation path are identical.

It is particularly useful for functions in the vehicle to be triggered, locked or released depending on the radiation received by the microwave receiver.

The method according to the invention can, for example, also be fashioned such that an electrically conductive foil is used for reflecting.

The method according to the invention can be further developed in that the backscattering process is implemented by a passive, a semipassive, a semiactive or an active backscattering process.

The method according to the invention can be further developed in a particularly advantageous manner in that the emitting and/or the receiving is/are carried out on the basis of an access control and ignition system installed in the vehicle.

For comparable reasons, it can be advantageous for the evaluation of received signals to be supported or carried out by means which are deployed as part of an access control and ignition system installed in the vehicle.

Furthermore, it can be useful for the backscattering process to be carried out by several differently modulating backscattering devices.

The method according to the invention is advantageously fashioned such that the at least one first radiation path and/or the at least one second radiation path follow(s) a straight-line route.

It can, however, also be useful for the at least one first radiation path and/or the at least one second radiation path to follow a roundabout route.

The method according to the invention can further be developed in a particularly advantageous manner such that the position of the object in the radiation path influences the received intensity on the basis of the diffraction of the microwaves around the object and such that the received intensity provides information about the position of the object.

The invention is based upon the recognition that particularly reliable and yet simple and cost-effective detection of seat occupancy can be provided by deploying a backscattering device, in particular a modulating backscattering device, as a reflector. The certainty of the system can also be improved by checking the place of reflection of the microwave radiation through a separately determined seated position on the basis of transit time measurements. Furthermore, microwave radiation diffraction phenomena can be used in an advantageous manner. Due to the considerable but not complete absorption of microwave radiation in the human body, there are advantages in using microwave radiation by comparison with using other wave forms, for example ultrasound, laser radiation or light and infrared radiation. Microwave radiation travels independently of pressure, temperature, brightness and other environmental conditions. The method of measurement is very fast due to the simplicity of the evaluation, so that dynamic measurement, for example only in the event of an impact, is possible. Further advantages of the invention are that detection of seat occupancy can be carried out at very high speed. The time for the recording can lie, for example, in the millisecond range. It is possible by this means to lend airbag control a dynamism which makes it for example possible even after an airbag has been triggered to influence the filling of the airbag depending on the seat occupancy or the position/inclination of the person on the seat, preferably through reduction of pressure.

BRIEF DESCRIPTION OF THE DRAWING

The invention will now be explained, using particularly preferred embodiments as examples, with reference to the accompanying drawings, in which.

DESCRIPTION OF THE PREFERRED EMBODIMENTS

In the description below of preferred embodiments of the present invention, the same reference symbols designate the same or comparable components.

Figure 1:
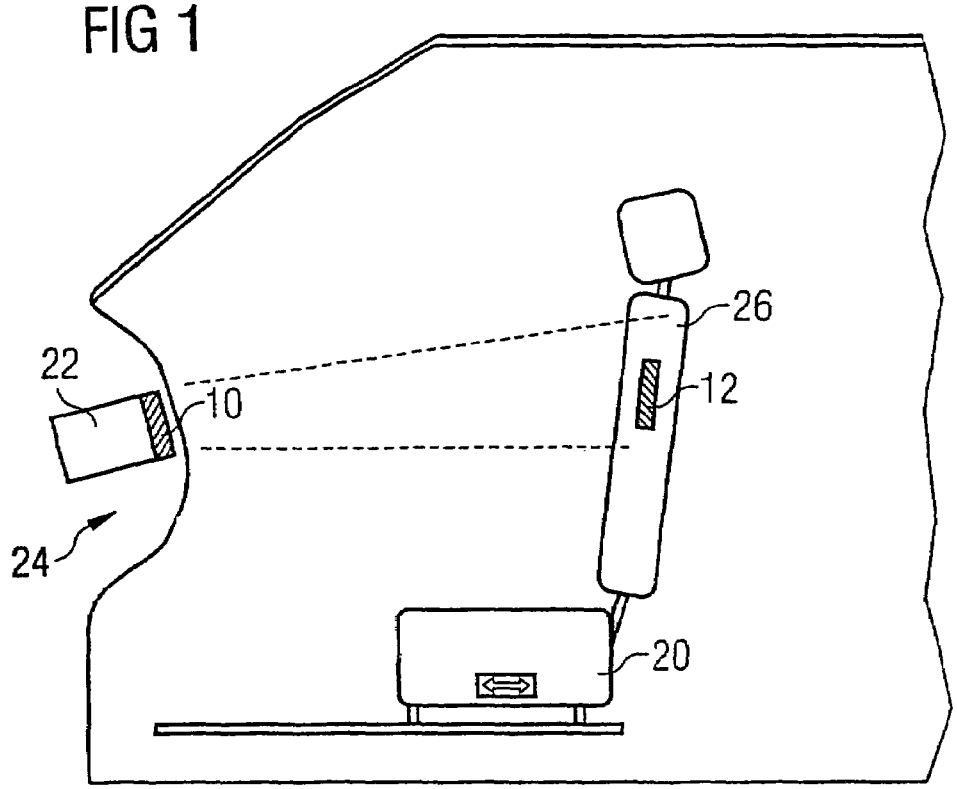
FIG. 1 shows a preferred embodiment of a system according to the invention.

FIG. 1 shows a preferred embodiment of a system according to the invention. A microwave transmitting and receiving device 10 is disposed in the dashboard or in the cockpit 24 of a vehicle. A reflector 12 which, depending on the embodiment, can be fashioned as a modulating backscattering device or as a simple electrically conductive foil (non-modulating backscattering device), is arranged in a back rest 26. The seat 20 can be displaced in the usual manner, it being particularly preferred if the position of the seat 20 can be determined.

Microwave radiation is emitted from the microwave transmitting and receiving device 10 towards the reflector 12. This microwave radiation is reflected by the reflector 12 and thus sent back to the microwave transmitting and receiving device 10. The reflection through the reflector 12 can take place in a conventional manner, if the reflector 12 is a simple electrical conductive film for example.

The reflection 12 can, however, also occur as part of a modulating backscattering process, a code being imprinted on the reflected radiation, for example through modulation. To this end, the reflector 12 can be fashioned as a passive, semipassive, semiactive or active backscattering device.

In a control unit 22, the signals emitted by the reflector 12 can be evaluated with regard to distance (signal transit time), level and quality.

In the situation shown in FIG. 1, no person is located on the seat 20. The reflected signal is therefore received with a high level and a high quality.

Besides the embodiment comprising a reflector 12 in the seat 20, it is also possible to implement the present invention without using a reflector. In this case, a microwave receiver can be disposed in the seat 20, for example at the point where the reflector 12 is positioned in FIG. 1. In a further embodiment, these positions of receiver and reflector can also be swapped. These principles also apply to the embodiments of the present inventions shown below.

Figure 2:
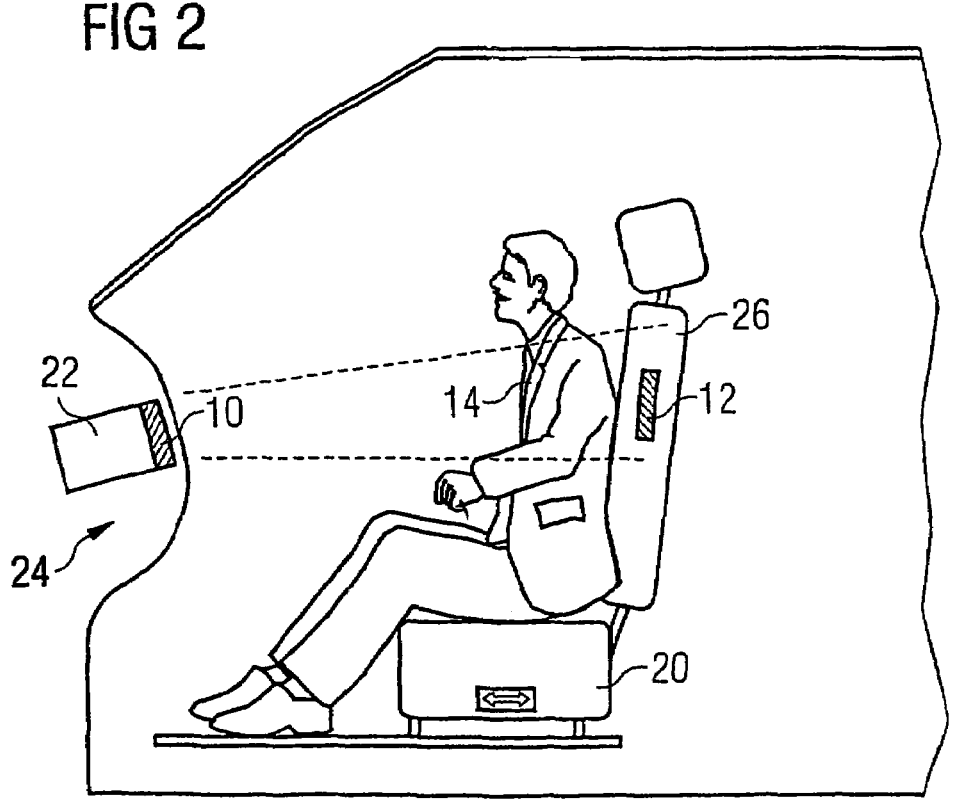
FIG. 2 shows the embodiment according to FIG. 1 with a person in a first seated position.

FIG. 2 shows the embodiment according to FIG. 1 with a person in a first sitting position. In this representation, a person 14 is sitting properly on the seat 20. The person covers the reflector 12. For this reason, the microwave transmitting and receiving device 10 receives a signal which is many orders of magnitude, for example six orders of magnitude, smaller than when the seat is unoccupied. In this case, activation of the airbag can be released so that said airbag activates in the event of an impact.

Figure 3:
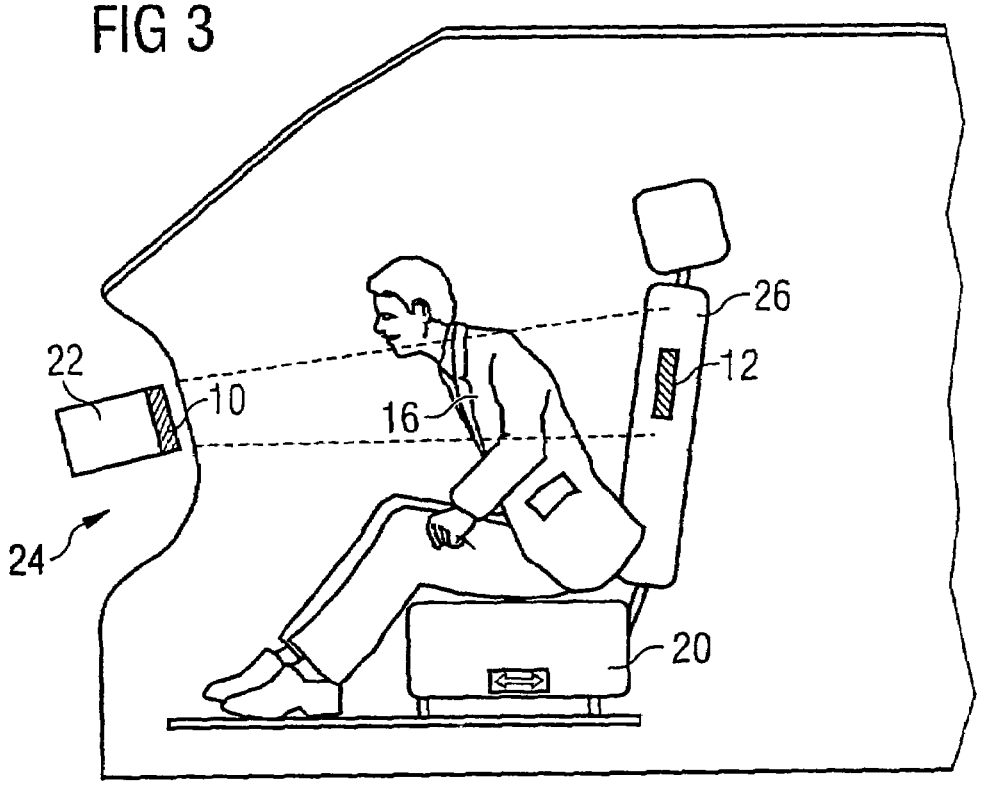
FIG. 3 shows the embodiment according to FIG. 1 with a person in a second seated position.

FIG. 3 shows the embodiment according to FIG. 1 with a person in a second sitting position. The person 16 shown here is inclined forward. If the upper body is to a sufficient degree in front of the reflector 12, then a sufficient intensity can again be transmitted from the microwave transmitting and receiving device to the reflector 12 and vice versa, from the reflector to the microwave transmitting and receiving device. The intensity can be used to detect the angle of inclination of the person. As of a certain angle of inclination, activation of the airbag is not appropriate because of head injuries; this is referred to as the out-of-position case. If the reflector and the out-of-position case are detected, activation of the airbag can be prevented. The critical angle of inclination, as of which the out-of-position case is detected, can be adjusted depending on the wavelength, level or intensity, reflector area, mounting of reflector and microwave sending and receiving device, evaluation algorithm, etc.

Figure 4:
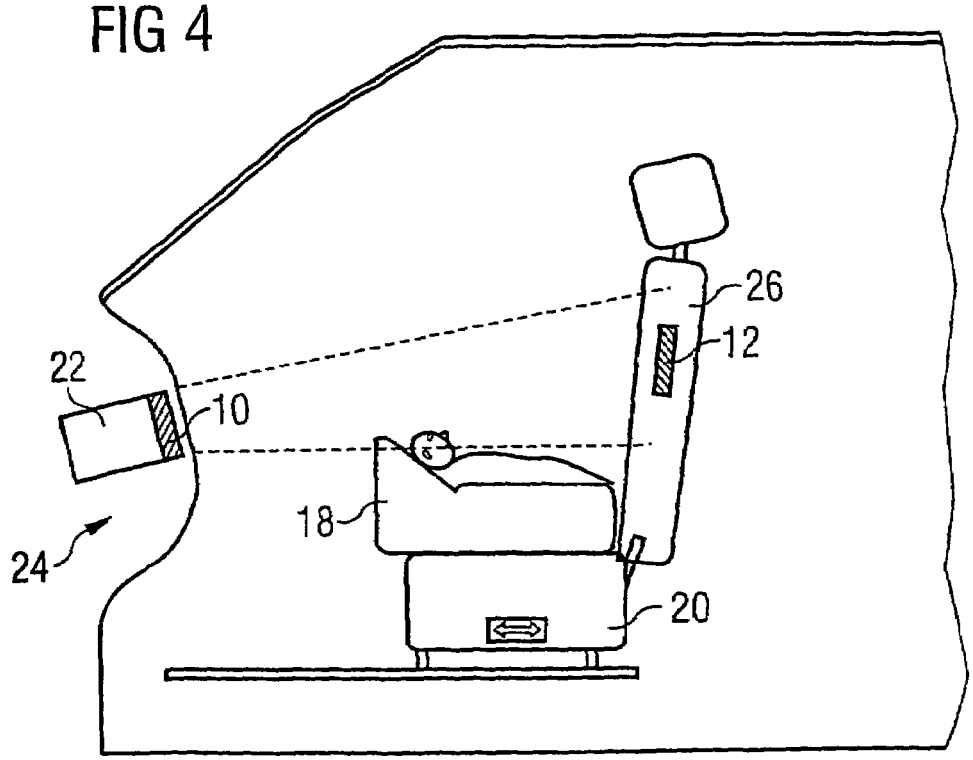
FIG. 4 shows the embodiment according to FIG. 1 with a seat occupied by a baby seat.

FIG. 4 shows the embodiment according to FIG. 1 with a seat occupied by a baby seat. Here, a baby is located in a child seat, in the present case in a so-called reboard seat 18. This seat is secured properly to the passenger seat 20. Due to the relative positions of microwave transmitting and receiving device 10, reflector 12 and reboard seat 18, only limited damping of the microwave radiation takes place. Consequently, activation of the airbag is prevented. In addition, it is possible and possibly very useful to fasten a reflector to the back of the reboard seat 18. In this way, the situation with child seat 18 on the seat 22 can be distinguished from the situation with no object on the seat 20, for example by means of special modulation of the microwave radiation by this reflector.

If in the system according to the invention the reflector 12 is shielded for example by a metal object, this results in more intense reflection. The intensity of this reflection may possibly lie in the same order of magnitude as the intensity of reflection by the reflector 12. There are now a variety of possible ways in which the control unit 22 can detect the different situations. If the reflector is a modulating backscattering device with unique encoding, then the reflection by the shading metal object is uniquely detected on this basis. Reflection by a shielding metal object can alternatively or additionally be detected on the basis of a signal transit time measurement, particularly if the transit time is compared with the actual seated position, which can be determined by an additional sensor.

It is also advantageous for objects having little or no electrical conductivity in front of the reflector 12 only to shield the reflector slightly. The signals received by the control unit therefore correspond to the "empty seat" position, so that activation of the airbag is correctly locked.

Figure 5:
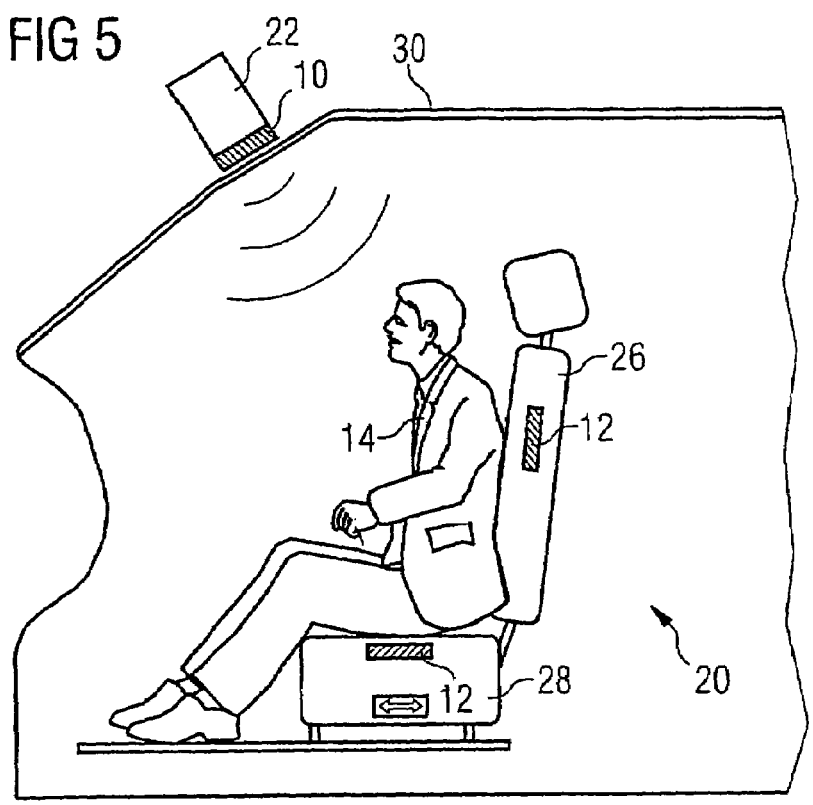
FIG. 5 shows a further preferred embodiment of a system according to the invention with a first person.

FIG. 5 shows a further preferred embodiment of a system according to the invention with a first person. In this exemplary embodiment, two reflectors 12 are built into the vehicle seat 20. A reflector 12 is disposed in the back rest 26; a further reflector 12 is disposed in the seat base 28. The control unit 22 with microwave transmitting and receiving device 10 is disposed in the roof control unit 30 of a vehicle.

When an adult person 14 is sitting properly on the seat, he/she covers the reflectors 12, and the control unit 22 receives a level several orders of magnitude lower than when the seat 20 is empty. To this extent, the system as per FIG. 5 operates in a comparable way to the systems described in connection with FIGS. 1 to 4. However, since an additional reflector 12 is now disposed in the seat base 28, the forward inclination of the person 14 can be detected with greater reliability. In this case, the person 14 namely exposes the reflector 12 so that microwave radiation, at least due to diffraction phenomena, can find its way between the microwave transceiver 10 and the reflector 12 in the back rest 26. The reflector 12 in the seat base 28, by contrast, is still completely covered by the person 14 so that this can be used as additional information indicating that this is a person leaning forward 14 and not an empty seat 20.

Figure 6:
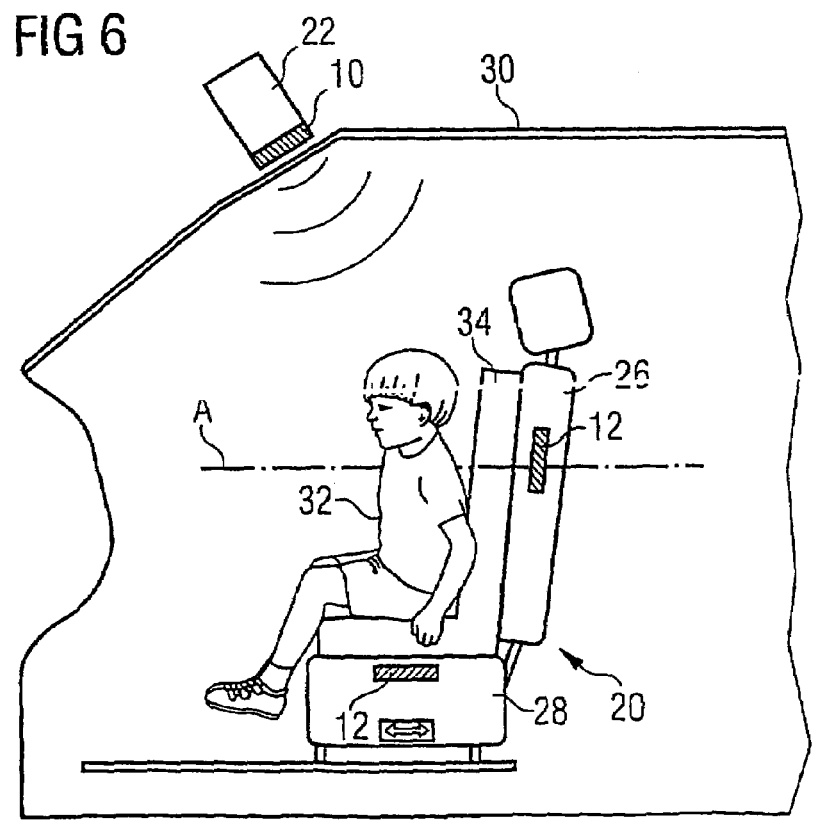
FIG. 6 shows the embodiment according to FIG. 5 with a second person.

FIG. 6 shows the embodiment as per FIG. 5 with a second person. On the basis of the system according to the invention, the situation shown here can also be distinguished from that of an adult person leaning forward, as was explained with reference to FIG. 5. A child 32 is sitting on a child seat 34 which is disposed on the seat 20. Also disposed in the seat 20 are two reflectors 12, one in the back rest 26 and one in the seat base 28. Because of the child seat 34, which in general absorbs the microwaves very much less than the body of the child 32, microwaves, due in particular to their diffraction properties, can find their way between microwave transceiver 10 and the reflectors 12 in the back rest 26 and the seat base 28. The reflector 12 in the seat base 28 therefore receives a greater intensity than it could receive if an adult person were sitting directly on the seat base 28.

Thus, through appropriate arrangement of several reflectors 12 and commensurate appropriate arrangement of the microwave transceiver 10, different situations can be detected with regard to seat occupancy in the vehicle.

Figure 7:
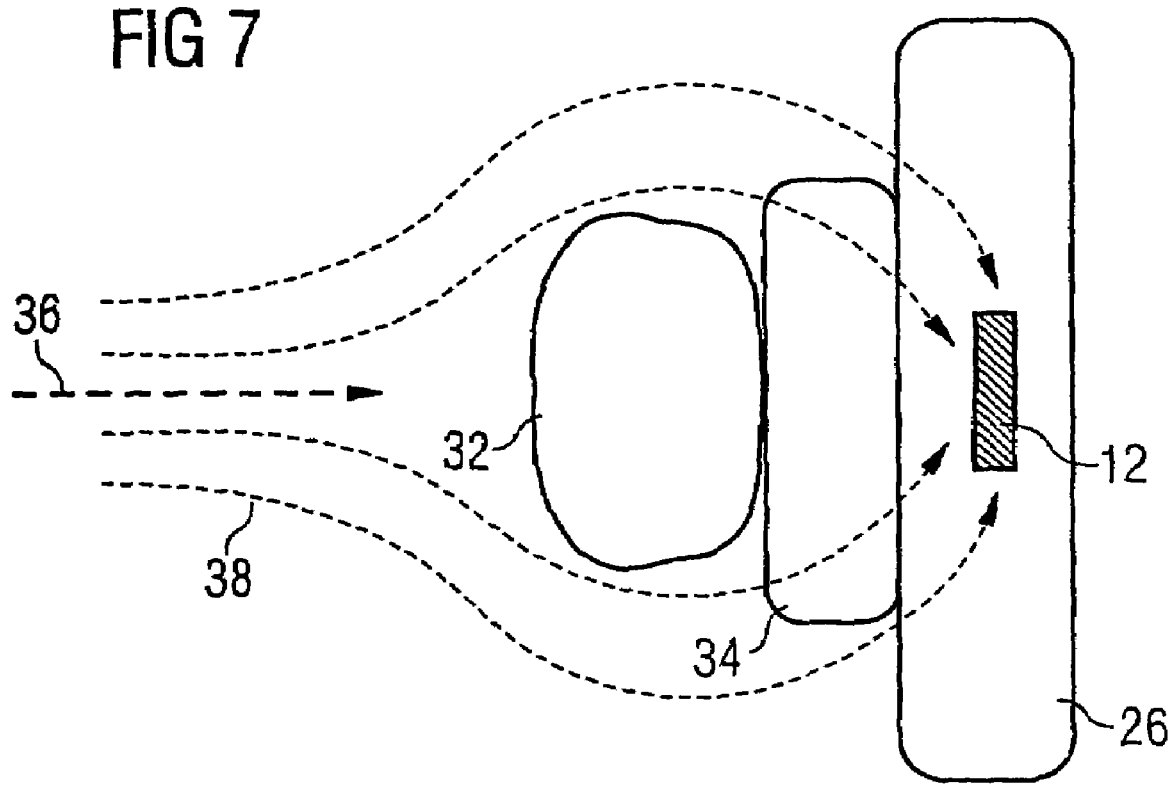
FIG. 7 shows a sectional view from above of the arrangement shown in FIG. 6.

FIG. 7 shows a sectional view from above of the arrangement shown in FIG. 6. The section in FIG. 7 is along the plane marked A in FIG. 6. Various paths are shown by which microwave radiation can reach the reflector 12 in the back rest 26, assuming the situation of a child 32 on a child seat 34. Firstly, there is the direct path 36 between microwave transmitter/receiver 10 and the reflector 12 which in the present situation is shielded by the child 32. Due to the distance between the child 32 and the reflector 12 which is maintained in each case by the child seat 34, microwaves can, however, also often pass from the microwave transceiver 10 to the reflector 12 and in the reverse direction on indirect paths 38, for example as a result of diffraction around the body and as a result of reflection or scattering. This is impeded only immaterially by the child seat 34 since, compared with the human body, it has a very much lower absorption capacity.

The invention can be summarized as follows. A system for detecting seat occupancy in a vehicle comprises a microwave transmitter 10, a microwave receiver 10 and preferably a reflector 12. If a person is located between these objects, then the microwave radiation is attenuated. The reflector 12 can be a modulating backscattering device, such that the radiation received by the receiver can be unequivocally associated with the reflector 12. If the reflection is not modulated, then a measurement of the transit time of the microwave radiation is carried out and this transit time processed further, possibly in combination with an analysis of the seated position of passengers. In preferred embodiments, it is provided that the microwave radiation diffraction properties around the object also be used to obtain further information about the seated position of passengers. The determination of whether and, if applicable, how a seat is occupied can advantageously be used for locking or for releasing an airbag.

The features of the invention disclosed in the above description, in the drawings and in the claims may be essential, both individually and in any combination, to practical implementation of the invention.

We claim:

1. A system for determining seat occupancy in a vehicle, comprising:
   at least one microwave transmitter, a plurality of reflectors stationarily disposed in predetermined locations at a seat of the vehicle, and at least one microwave receiver, commonly arranged:
      to define between said microwave transmitter and said microwave receiver a radiation path divided into at least one first radiation path and at least one second radiation path;
      wherein microwave radiation emitted by said microwave transmitter can reach at least one of said reflectors along the at least one first radiation path when the seat is unoccupied;
      wherein the microwave radiation, after reflection by said at least one reflector can reach said microwave receiver via the at least one second radiation path;
      wherein, depending on the seat occupancy, an object may be located in at least one of the first radiation path and the second radiation path and the radiation received by the microwave receiver may be influenced in dependence on the seat occupancy; and
   wherein said reflectors are modulating backscattering devices.

2. The system according to claim 1, wherein said at least one microwave transmitter and said at least one microwave receiver are disposed spatially separate from one another.

3. The system according to claim 1, wherein:
   said at least one microwave transmitter and said at least one microwave receiver are implemented in at least one microwave transmitting and receiving device comprising a transmitting and receiving antenna; and
   the at least one first radiation path and the at least one second radiation path are identical.

4. The system according to claim 1, which comprises a control unit configured to selectively trigger, block, or enable functions in the vehicle depending on the radiation received by said microwave receiver.

5. The system according to claim 1, wherein said reflectors are formed of electrically conductive foil.

6. The system according to claim 1, wherein said reflectors are backscatter devices selected from the group consisting of passive devices, semi-passive devices, semi-active devices, and active devices.

7. The system according to claim 1, wherein said at least one microwave transmitter and/or said at least one microwave receiver are components of an access control and ignition system of the vehicle.

8. The system according to claim 1, wherein the signals received by said microwave receiver are processed for evaluation with means used in an access control and ignition system installed in the vehicle.

9. The system according to claim 1, wherein said reflectors are differently modulating backscattering devices.

10. The system according to claim 1, wherein the first and second radiation paths follow a straight line.

11. The system according to claim 1, wherein the at least one first radiation path and/or the at least one second radiation path follow a roundabout route.

12. The system according to claim 1, wherein:
   a position of the object in the radiation path influences an intensity of a signal received by said microwave receiver due to a diffraction of microwaves about the object; and the intensity of the received signal provides information about the position of the object.

13. A method of determining seat occupancy in a vehicle, which comprises the following steps:
defining a radiation path with at least one first radiation path and at least one second radiation path;
emitting microwave radiation to propagate along the at least one first radiation path;
reflecting the microwave radiation from a defined location at the seat of the vehicle with a modulating backscattering process to form reflected microwave radiation, and causing the reflected radiation to propagate along the at least one second radiation path;
receiving the reflected microwave radiation; and
determining a seat occupancy and deducing whether or not an object is located in at least one of the first radiation path and the second radiation path, where the radiation received by a microwave receiver is influenced depending on the seat occupancy.

14. The method according to claim 13, which comprises placing the at least one microwave transmitter and the at least one microwave receiver spatially separate from one another.

15. The method according to claim 13, wherein the at least one first radiation path and the at least one second radiation path are identical.

16. The method according to claim 13, which comprises selectively triggering, locking, or releasing functions in the vehicle in dependence on the radiation received.

17. The method according to claim 13, which comprises reflecting the radiation with an electrically conductive foil.

18. The method according to claim 13, which comprises implementing the backscattering process with a passive, a semi-active, a semi-passive, or an active backscattering device.

19. The method according to claim 13, which comprises emitting and/or receiving with an access control and ignition control system installed in the vehicle.

20. The method according to claim 13, which comprises carrying out or supporting an evaluation of the received signals within a framework of an access control and ignition system installed in the vehicle.

21. The method according to claim 13, which comprises effecting the backscattering process with a plurality of differently modulating backscattering devices.

22. The method according to claim 13, wherein the at least one first radiation path and/or the at least one second radiation path follow a straight-line route.

23. The method according to claim 13, wherein the at least one first radiation path and/or the at least one second radiation path follow a roundabout diversion route.

24. The method according to claim 13, wherein a position of the object in the radiation path influences an intensity of a received signal due to a diffraction of microwaves; and the method comprises deducing information about the position of the object from the intensity of the received signal.

* * * * *